United States Patent [19]
Markham

[11] Patent Number: 5,304,814
[45] Date of Patent: Apr. 19, 1994

[54] SENSOR CIRCUIT AND METHOD FOR DETECTING THE PRESENCE OF A SUBSTANCE SUCH AS INK EJECTED FROM A THERMAL INK EJECTING PRINT HEAD, OR THE LIKE

[75] Inventor: Roger G. Markham, Webster, N.Y.
[73] Assignee: Xerox Corporation, Stamford, Conn.
[21] Appl. No.: 23,434
[22] Filed: Feb. 26, 1993
[51] Int. Cl.$^5$ ................. G01D 15/16; G01N 15/06
[52] U.S. Cl. ................. 250/573; 250/214 R; 346/140 R
[58] Field of Search ............ 250/573, 214 R; 346/1.1, 140 R; 356/336, 440

[56] References Cited
U.S. PATENT DOCUMENTS 4,281,332  7/1981  Horike ........................ 346/140 R
4,933,684  6/1990  Tasaki et al. ................ 346/140 R Primary Examiner—David C. Nelms
Assistant Examiner—Stephone Allen
Attorney, Agent, or Firm—Oliff & Berridge

[57] ABSTRACT

A sensor circuit and method for detecting the presence of a substance having a flow that can be turned on and off, such as ink in an ink ejecting print head, has means for turning on and off the flow of the substance at a predetermined frequency. An optical sensor has a light path that is at least partially interrupted by the substance when the flow is turned on. The optical sensor is biased to operate within a range in which the sensor produces an output, even though the light path is only partially interrupted by the substance. An integrator integrates the output of the sensor, and a high gain amplifier amplifies the integrated signal to provide a sensor circuit output signal. When the substance at least partially interrupts the light path, the integrated output signal indicates its presence. The circuit is preferably used to control a heater of a thermal ink ejecting print head by adjusting the power to the heater to assure its operation with a power applied above the power threshold at which ink ejection begins.

25 Claims, 4 Drawing Sheets

SENSOR CIRCUIT AND METHOD FOR DETECTING THE PRESENCE OF A SUBSTANCE SUCH AS INK EJECTED FROM A THERMAL INK EJECTING PRINT HEAD, OR THE LIKE

BACKGROUND OF THE INVENTION

1. Field of the Invention

This invention relates to improvements in methods, circuits, and apparatuses for optically detecting the presence of a flowable substance, such as ink ejected from a thermal print head or the like, and, more particularly, to such improvements and methods that do not require absolute light levels to enable detection of such substances.

2. Relevant Background

It is often desired to detect the presence of a flowable substance in a particular region, for instance, in the operation of thermal ink ejecting print heads that may be associated, for example, with printers for use in conjunction with computers or other systems. Typically, such thermal ink ejecting print heads have a plurality of apertures from which the ink is ejected after being heated by one or more heating elements within the print head. One mechanism that is frequently employed uses a heater to which ink is delivered by capillary action of an ink delivery tube. As an ink drop comes into proximity with the heater, the ink is partially vaporized into an expanding steam component that explosively expels the remaining portion of the ink drop from the aperture of the print head. The capillary action of the delivery tube brings additional volumes of ink to form additional ink drops for successive expulsion from the aperture of the print head. Thus, although the "jet" of ink being expelled from the print head appears to be a continuous stream of fluid, in reality, the stream is a plurality of successive explosively ejected ink drops from the aperture that is associated with the heating element as ink is delivered drop-by-drop from the capillary tube.

The frequency at which the drops are produced is dependent upon a number of factors, including the rate at which the capillary action can deliver ink to the heater, the rate at which the heater can be energized, the physical dimensions of the apertures and chambers in which the ink is partially converted to steam, and the like. In a typical system, for example, the ink drop ejection rate is between about 3–5 kHz.

In the heating mechanism associated with the ink drop expulsion, if the power to the heating element is insufficient to produce the steam pressure necessary for the expulsion of the ink drop, no ink will be expelled from the print head. It has been found, in fact, that the power threshold for enabling ink ejection is quite sharp. On the other hand, if an excessive amount of power is applied to the heater, portion of the ink drop may be ashed. This unnecessary ashing may deposit on the heater and other print head parts, ultimately resulting in degraded operation, and in many cases, complete failure of the print head.

At various times, for example upon completion of the manufacture of the printer in which the print head is included, or, ideally, upon individual power up events in which the printer is used, the power level applied to the heaters of the print head may be adjusted to insure that it is above the ink producing threshold, but below the level that produces undesired ink disintegration. Since many manufacturing tolerances and part variations exist, the optimum power ranges may vary significantly from printer to printer. However, heretofore, the methods and circuitry that have been proposed to assure proper power level determination are relatively complicated and expensive to implement.

For example, one of the problems that exists in determining whether the power level applied to the heater is above the threshold required to produce ink ejection is in the detection of the ink that actually has been ejected from the print head. More specifically, the ink that is ejected does not necessarily completely block an optical path that otherwise could be monitored with inexpensive optical sensors or the like. The ink volume, in fact, may result only in a partial obstruction of the optical path, resulting in risk of non-detection of the presence of the ink and overpowering of the heaters.

SUMMARY OF THE INVENTION

In light of the above, it is, therefore, an object of the invention to provide an improved sensor for determining the presence of a substance, such as ink or the like, that can be controllably modulated on and off.

It is another object of the invention to provide a sensor for controlling a heater in a thermal ink jet ejecting print head to operate above a predetermined ink ejection threshold, without overpowering the heater.

It is another object of the invention to provide a sensor of the type described that is essentially ac coupled to the ink ejected from the print head.

It is another object of the invention to provide a circuit of the type described that automatically compensates for variations in manufacturing tolerances of parts and components used in the construction of thermal ink ejection printers, or the like.

It is another object of the invention to provide an optical sensor circuit that has an ability to detect the presence of a substance, such as ink or the like, without requiring an absolute lightness detection within the optical path of an optical sensor, caused by presence of the substance to be detected.

It is another object of the invention to provide a circuit that can be realized inexpensively and that can be added to a thermal ink ejection printer without significantly increasing production costs.

These and other objects, features and advantages will become apparent to those skilled in the art from the following detailed description when read in conjunction with the accompanying drawings and appended claims.

In accordance with a broad aspect of the invention, a sensor circuit is presented for detecting the presence of a substance, such as ink from an ink ejecting print head, or the like, that has a flow that can be turned on and off. The circuit has means for turning on and off the flow of the substance at a predetermined frequency. An optical sensor is provided that has a light path that is at least partially interrupted by the substance when it is flowing. An integrator integrates the output of the sensor to produce an integrated output signal, and a high gain amplifier amplifies the integrated output signal to provide a sensor circuit output signal. When the substance at least partially interrupts the light path, the integrated sensor output signal indicates its presence.

Means are provided for biasing the optical sensor to operate within a range in which the sensor produces an output, even though the light path is only partially interrupted by the substance. Thus, even though the light path may be only partially interrupted by the substance, the optical sensor can be of the type that produces only a binary sensor output signal, such as a slot type photo-interrupter switch, or the like.

In an embodiment of the invention in which the circuit is used to control a heater of a thermal ink ejecting print head, means are provided for turning power to the heater on and off at a predetermined frequency. An optical sensor produces a sensor output signal, the sensor being located in proximity to the print head such that its light path is at least partially interrupted by ink when the ink is ejected from the print head. An integrator integrates the sensor output signal at frequencies that include the predetermined frequency to produce an integrated output signal. Circuitry is provided to vary the power level to the heater in response to the integrated output signal to operate the heater at a power level that produces ink ejection. Thus, the heater is assured to be operated with a power applied that is above the power threshold at which ink ejection begins.

The circuit may also include a high gain amplifier connected to receive the integrated output signal to provide a sensor circuit output signal. The high gain amplifier is connected to receive the integrated output signal via a high pass filter that passes frequencies, for example, above about 1.6 Hz. The integrator additionally provides a low pass filter that passes frequencies, for example below 16 Hz. The high and low pass filters are, therefore, effective when the power to the heater is turned on for about 0.1 seconds and off for about 0.1 seconds, that is, in which the predetermined frequency is about 5 Hz.

The circuit for varying the power level to the heater can accomplish power control in various ways, such as, for example, by controlling a voltage applied to the heater, or by varying a pulse width of a power signal applied to the heater.

In accordance with another broad aspect of the invention, a method for controlling an operating threshold of a heater of a thermal ink ejecting print head includes the step of modulating power to the heater at a predetermined modulation frequency. A path of the ejected ink is observed with an optical sensor to produce a sensor output signal. The sensor output signal is integrated to produce an integrated sensor output signal which is amplified to produce an amplified output signal. The threshold of the heater is then adjusted in accordance with a level of the amplified output signal.

In still another broad aspect of the invention, a method for controlling the operating power level of a heater of a thermal ink ejecting print head is presented. In accordance with this embodiment, the power to the heater is (a) turned off and on at a predetermined frequency. (b) A path along which any ejected ink would traverse if present is observed with an optical sensor to produce a sensor output signal. (c) The sensor output signal is integrated to produce an integrated output signal, and (d) if an output state change is not produced in the integrated output signal to indicate the presence of ink in the ink path, the power level is increased, and steps (a) through (d) are repeated.

BRIEF DESCRIPTION OF THE DRAWING

The invention is illustrated in the accompanying drawings, in which.

DETAILED DESCRIPTION OF THE PREFERRED EMBODIMENTS

Figure 1:
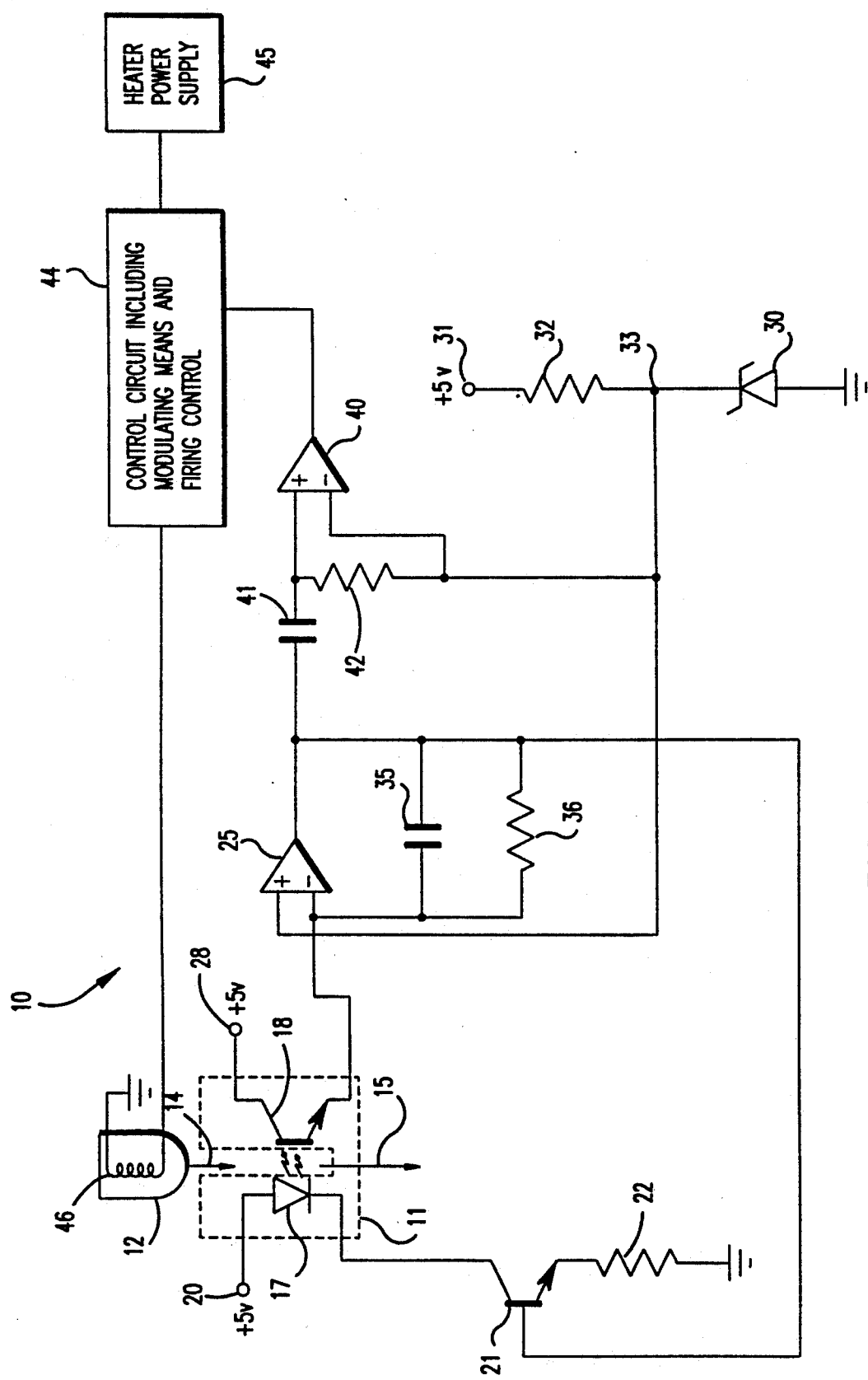
FIG. 1 is an electrical schematic diagram of a circuit for controlling the power for a heating element of a thermal ink ejection print head, in accordance with a preferred embodiment of the invention.

A circuit 10 for controlling a heating element 46 in a thermal ink ejection print head 12 is shown in FIG. 1. The circuit 10 includes an optical sensor 11 that is located in proximity to the thermal ink ejection print head 12. The optical sensor 11 can be a commercially available photo-interrupter switch type, or other type that produces a binary sensor output signal, one sensor that can be used for example, being that sold by Harris Corporation under the designation "H22A1".

The optical sensor 11 is located so that ink droplets that are ejected from the print head 12 pass through an optical path of the optical sensor 11 along path 14–15. The ink at least partially interrupts the light between the light emitting diode 17 and optical transistor 18 of the optical sensor 11. Although only a single ink flow path along lines 14 and 15 are shown, it will be appreciated that typical thermal ink ejecting print heads may include a plurality of patterned ink jet paths, not shown. As will become apparent, it is not necessary that the ink traversing the optical path of the optical sensor 11 completely obscure the optical path.

The optical sensor 11 is biased to operate in a linear operating range. More particularly, current flowing through the light-emitting-diode 17 between a positive source of potential on terminal 20 to ground is controlled by an npn transistor 21 that has a resistor 22 connected between its emitter and ground. The value of the resistor 22 is selected to insure that the output from an operational amplifier 25 in a feedback loop is more negative than the potential on its inverting input. Additionally, the resistor 22 can be further sized to minimize the bias on the capacitors 35 and 41, below described. The base of the control transistor 21 is connected to the output of the operational amplifier 25 that is connected as an integrator circuit, in the feedback loop, as described below. The operational amplifier 25 can be any suitable commercially high gain operational amplifier, such as, for example, that widely available under part number "LM158".

The photo detector transistor 18 of the optical sensor 11 is connected with its current flow path between a terminal 28 and an inverting input of the operational amplifier 25. A reference voltage is connected to the non-inverting input of the operational amplifier 25 that can be developed, for example, by a zener diode 30 connected between ground and a positive potential on a terminal 31. A resistor 32 may be connected between the positive potential on the terminal 31 and the cathode of the zener diode 30 to provide a desired voltage drop on the node 33 to be regulated by the action of the zener diode 30. Of course, it will be appreciated that the zener diode 30 can be replaced by a resistor; however, in such instance, less certainty exists that supply voltage spikes will not trigger the output.

The capacitor 35 and a resistor 36 are connected in parallel between the output of the operational amplifier 25 and its inverting input to form the integrating circuit referred to above. The capacitor 35 and resistor 36 are sized to provide a low pass filter, to pass, for example, signals having a frequency less than about 16 Hz (for a 5 Hz power modulation frequency applied to the heater 46, as below described). Further, the value of the resistor 36 is selected to produce a sizeable photocurrent through the photo-transistor 18.

It will therefore be appreciated that the feedback loop from the output of the operational amplifier 25 to the base of the npn transistor 21 linearizes the sensor LED current, which can be stabilized to center the operating range of the photo-transistor 18 between ground and +5 volts.

A second stage high gain amplifier is provided that includes an operational amplifier 40. The operational amplifier 40 also can be any suitable commercially high gain operational amplifier, such as, for example, that widely available under part number "LM158". The output from the first stage operational amplifier 25 is connected to the non-inverting input of the operational amplifier 40 via a high pass filter that includes the capacitor 41 and a resistor 42. The resistor 42 is connected between the non-inverting and inverting inputs of the operational amplifier 40, the inverting input being additionally connected to the node 33 on which the reference voltage is established by the zener diode 30.

As mentioned, the capacitor 41 and resistor 42 are sized to provide a high pass filter to the signal that is developed at the output of the operational amplifier 25. Thus, a frequency, for example, above 1.6 Hz is allowed to pass to be applied to the non-inverting input of the amplifier 40, (again, for a 5 Hz power modulation frequency applied to the heater 46, as below described). The resistor 42 is sized to be as large as possible, while assuring that the bias current of the second stage flows through it, to form a threshold level to block lower level signals at the input of the operational amplifier 40.

The output of the operational amplifier 40 is connected to a control circuit 44 to control the power supply 45 for the heater element 46 of the thermal ink ejecting print head 12, in the operation of the circuit 10 as described below.

Figure 2:
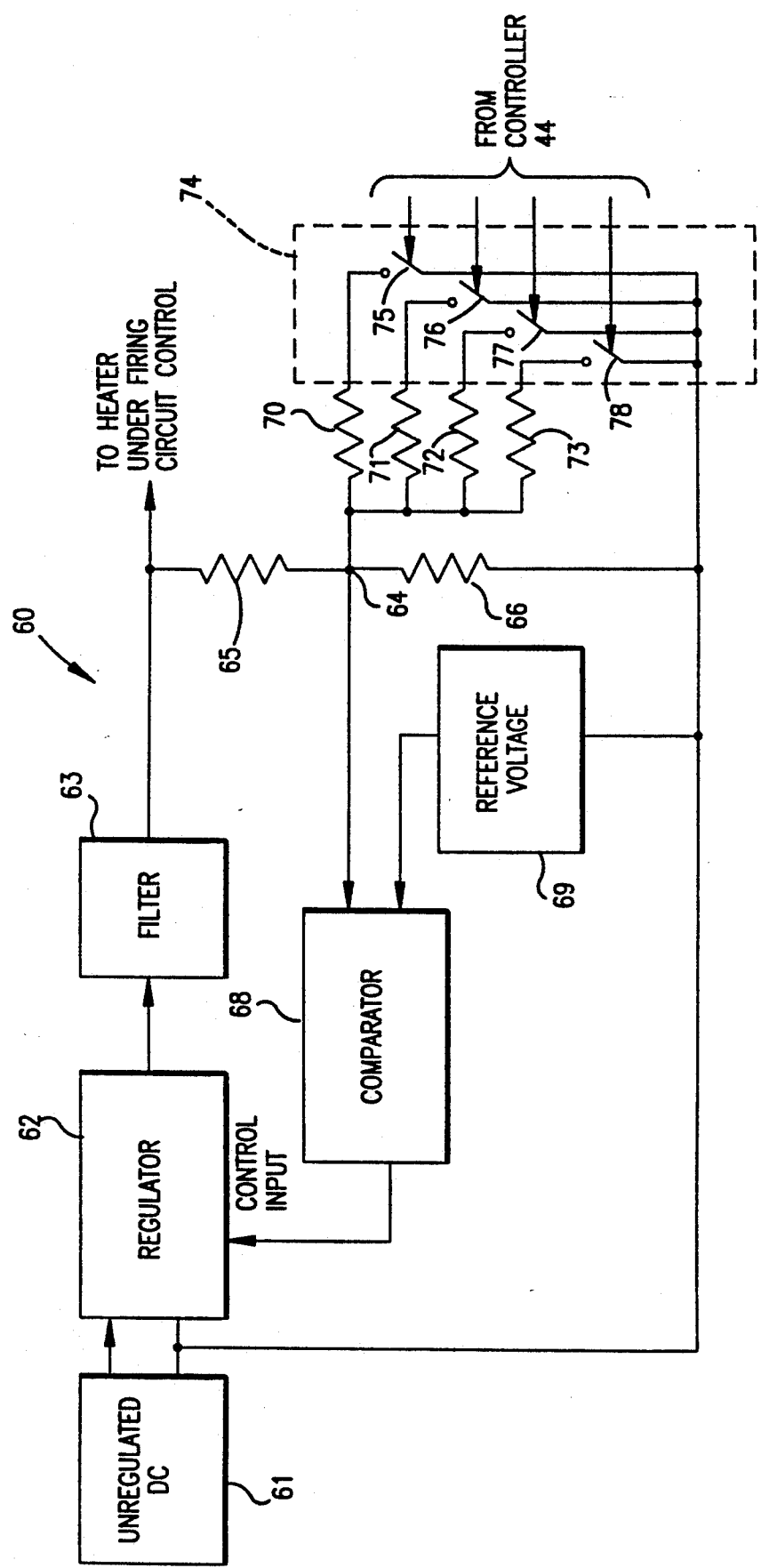
FIG. 2 is an electrical schematic and box diagram showing a controlled voltage power supply for controlling the power to a heater element of a thermal ink ejecting print head in accordance with one embodiment of the invention.

A power supply circuit 60 that can be used in conjunction with the sensor circuit of the invention is shown in FIG. 2. The power supply circuit 60 includes a source of unregulated dc, 61, that provides a dc output that is regulated by a regulator circuit 62. The regulator circuit 62 can be a linear or switching type regulator, or other type, as desired. The regulated dc output is filtered by a filter circuit 63 and applied to a voltage divider that includes resistors 65 and 66. A comparator circuit 68 compares the voltage developed at the interconnection node 64 of the voltage divider resistors 65 and 66 with a reference voltage developed by a reference voltage circuit 69 to provide a control input to the regulator circuit 62.

A plurality of resistors 70-73 are switchably connected in parallel with one of the voltage divider resistors, in this case, the lower resistor 66. In the embodiment illustrated, for example, four resistors 70-73 may be switchably connected in parallel with the resistor 66 to provide sixteen resistor combinations to adjust the voltage on the node 64. Respective switches 75-78 are provided under the control of the control circuit 44 shown in FIG. 1. In the embodiment illustrated, the switches 75-78 can be provided by a MOSFET array 74, such as that commercially available under a widely known part number "VN0206", the individual switches 75-78 being provided by selected MOSFETs of the MOSFET array.

Figure 4:
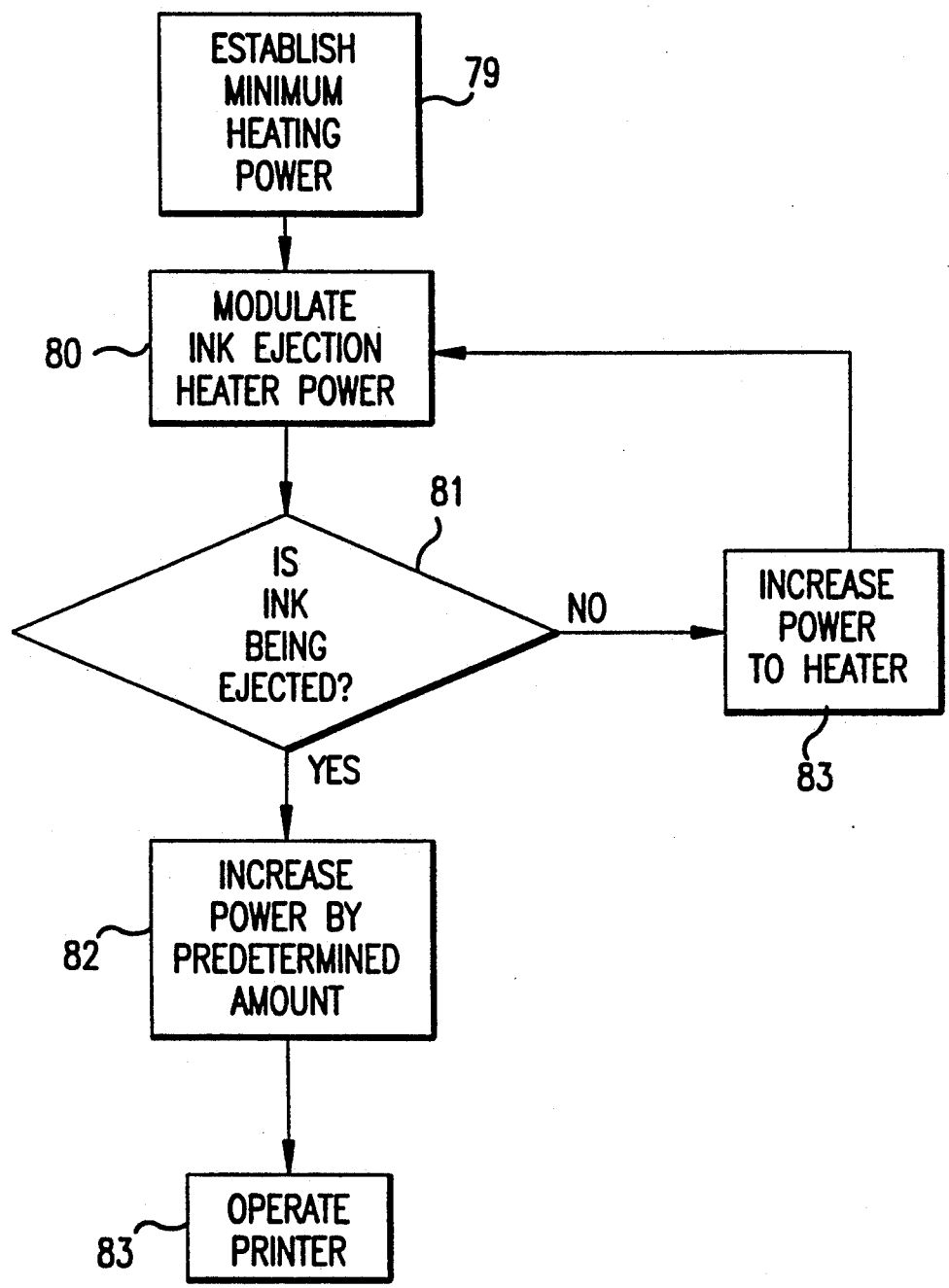
FIG. 4 shows a box diagram illustrating the steps in the operation of the sensor circuit, in accordance with the method of the invention.

In operation, with reference to FIGS. 1, 2, and 4, at startup, such as, for example, in response to a power on reset signal (not shown), the control circuit 44 is operated to switchably select a combination of resistors 70-73 that establishes a minimum power output level 79 on the top of the resistor 65, and to modulate the heater power 80 to the print head 12 by turning on and off the power supply. It will be appreciated that the ink ejection mechanism operates at a frequency of about 5 kHz, as described above, at which the ink is rapidly heated and expelled from within the print head 12. Thus, during the period that the power is turned on, ink drops will be ejected from the print head, if a sufficient power level is applied to the heater to create sufficient steam forces, otherwise, no ink will be ejected.

During the modulation of the power applied to the heaters, the power is turned on and off at a desired modulation frequency; for example, the "on" period can be 0.1 seconds and the "off" period can be 0.1 seconds thereby producing a modulation frequency of 5 Hz. Of course, during the turn on time, the heater is energized at as high a frequency as possible that produces streams of ink drops in accordance with the mechanics and physical construction of the print head, as described above.

After the ink has been modulated for a sufficient time to allow the integrating-function-producing operational amplifier 25 of the circuit 10 of FIG. 1 to settle, the presence or absence of ink along the paths 14 and 15 from the print head 12 is determined 81. If ink flow is determined to be present due to the state change of the output of the amplifier 25, the minimum power threshold necessary for operation of the print head has been determined. At this point, the power may be increased by a predetermined amount 82 to a desired operating level above the determined minimum or threshold power level, and normal operation commenced 83. Conversely, if no ink presence is detected after the integrating settling time, the control circuit 44 operates to select a different combination of the resistors 70-73 shown in FIG. 2 to increase the power 83 applied to the heater 46 of the print head 12. The ink modulation and detection process is continued until ink is determined to be present, indicating that the minimum power threshold has been reached.

As mentioned, the ink flow is determined to be present or not in accordance with the state change of the output of the amplifier 25. It should be noted that if no ink is present, there will be no signal to be integrated by the integrator circuit provided by the operational amplifier 25 and associated components. On the other hand, if an amount of ink, not necessarily a sufficient quantity to completely block the light path of the optical sensor 11 is present, its presence will be detected by the integrating and biasing action of the integrator and optical sensor 11. Thus, the output from the high gain amplifier 40 is still a "yes" or "no" value, despite the ac coupling of the circuit to the photodetector detecting the ink flow from the print head.

Figure 3:
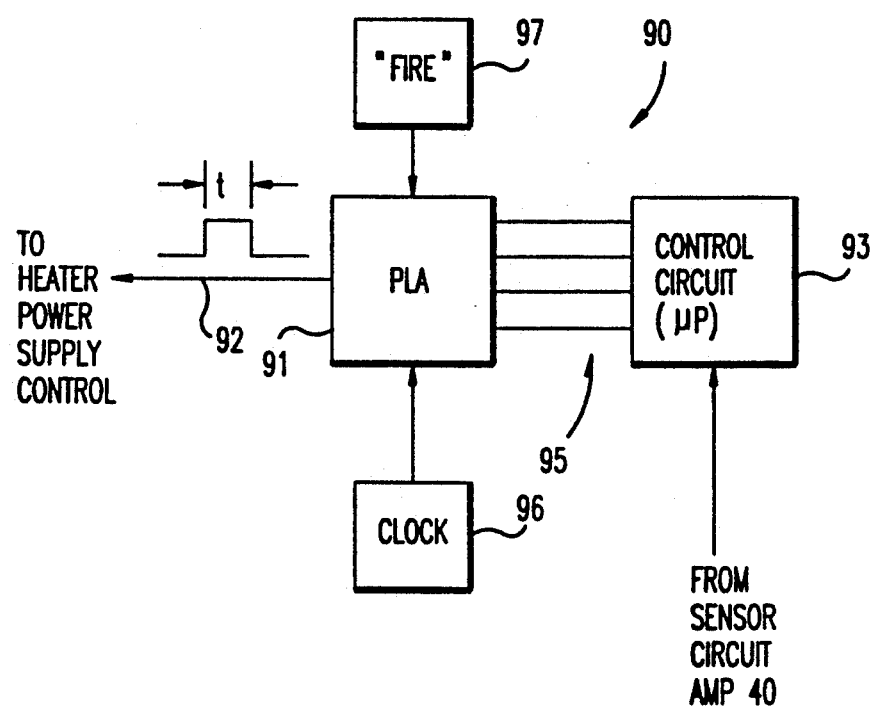
FIG. 3 is a box diagram of a pulse width control circuit for controlling the power to a heater of a thermal ink ejecting print head in accordance with another embodiment of the invention.

The power supply can be controlled in ways other than controlling the output voltage to achieve the desired goal of controlling the power to the heater element 46. For example, an alternative power supply control embodiment is shown by the box diagram 90 in FIG. 3. The power supply control circuit 90 includes a programmable logic array 91 (PLA) that is internally arranged to produce output pulses of varying width, t, on output line 92. The PLA 91 is addressed by a control circuit 93. The control circuit 93 can be, for example, a portion of the control circuit 44 shown in FIG. 1, a programmed microprocessor, a microcontroller, or other control circuit. The control circuit 93 has a number of addressing lines 95 to the PLA 91 to selectively address the PLA 91 for selection of the logic circuitry therein necessary to produce the output pulse of desired width.

A clock generator 96 is provided to provide clock pulses to the PLA 91 for the timing and measurement of the periods for selection in the generation of the output pulse on output line 92. Finally, a "fire" circuit 97 is provided to supply timing signals to the PLA 91 when an output pulse is desired on the output line 92. The fire circuitry 97 can be provided as a part of the control circuit 93, or may be separately provided, as shown. The output from the circuit 90 on the output line 92 can be used directly to energize the heater 46, or, alternatively, can be used to operate a switch circuit (not shown) that connects a fixed voltage power supply to the heater for the time period determined by the pulse width developed by the circuit 90.

The function of the circuit 90 is essentially the same as that of the control voltage circuit 60 described above with reference to FIG. 2, except that the pulses delivered to the heater 46 are of controlled width. Thus, a controllable amount of power is supplied by the circuit 90 as necessary to establish and maintain the threshold power necessary for ink drop ejection from the print head 12.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A sensor circuit for detecting the presence of a substance having a flow that can be turned on and off, comprising:
   means for turning on and off the flow of the substance at a predetermined frequency;
   an optical sensor for producing a sensor output signal, said optical sensor being located to have a light path that is at least partially interrupted by the substance when the substance traverses the light path;
   an integrator for integrating the output of the sensor output signal to produce an integrated output signal; and
   a high gain amplifier to amplify the integrated output signal to provide a sensor circuit output signal.

2. The sensor circuit of claim 1 further comprising means for biasing the optical sensor to operate within a range in which the sensor produces an output when light is only partially interrupted by the substance within the light path.

3. The sensor circuit of claim 1 wherein the optical sensor produces only a binary sensor output signal.

4. The sensor of claim 1 wherein said optical sensor is a slot type photo-interrupter switch.

5. A sensor for controlling a heater of a thermal ink ejecting print head, comprising:
   means for turning power to the heater on and off at a predetermined frequency;
   an optical sensor for producing a sensor output signal and having a light path that is at least partially interrupted by ink when the ink is ejected from the print head;
   an integrator to integrate the sensor output signal at frequencies that include the predetermined frequency to produce a integrated output signal; and
   circuitry for varying the power level to the heater in response to the integrated output signal to operate the heater at a power level that produces ink ejection.

6. The sensor circuit of claim 5 wherein the optical sensor produces only a binary sensor output signal.

7. The sensor of claim 5 wherein said optical sensor is a slot type photo-interrupter switch.

8. The sensor of claim 5 wherein said circuit for varying the power level adjusts the power level to operate above a power threshold at which ink ejection begins.

9. The sensor of claim 5 further comprising circuitry to bias the optical sensor to operate in an operating region determined by the integrated output signal.

10. The sensor circuit of claim 5 further comprising means for biasing the optical sensor to operate within a range in which the sensor produces an output when light is only partially interrupted by ink within the light path.

11. The sensor of claim 5 further comprising a high gain amplifier connected to receive the integrated output signal to provide a sensor circuit output signal.

12. The sensor of claim 11 further comprising a high pass filter connected to deliver the integrated output signal to said high gain amplifier.

13. The sensor of claim 12 wherein said high pass filter passes frequencies above about 1.6 Hz.

14. The sensor of claim 5 wherein said integrator provides a low pass filter.

15. The sensor of claim 14 wherein the low pass filter passes signals of frequency below 16 Hz.

16. The sensor of claim 5 wherein the means for turning power to the heater on and off turns the ink ejection on for about 0.1 seconds off for about 0.1 seconds.

17. The sensor of claim 5 wherein said circuitry for varying the power level of the heater comprises circuitry for controlling a voltage applied to the heater.

18. The sensor of claim 5 wherein said circuitry for varying the power level of the heater comprises circuitry for varying a pulse width of a power signal applied to the heater.

19. A method for controlling an operating threshold for a heater of a thermal ink ejecting print head, comprising:
   modulating power to the heater at a predetermined modulation frequency;
   observing a path of the ejected ink with an optical sensor to produce a sensor output signal;
   integrating the sensor output signal to produce an integrated sensor output signal;
   amplifying the integrated sensor output signal to produce an amplified output signal;
   adjusting the threshold of the heater in accordance with a level of the amplified output signal.

20. The method of claim 19 further comprising operating the optical sensor in a linear operating range in response to the integrated sensor output signal.

21. The method of claim 19 wherein said integrating step comprises integrating the sensor output signal at the predetermined modulation frequency.

22. A method for controlling an operating power level for a heater of a thermal ink ejecting print head, comprising:
(a) turning off and on the power to the heater at a predetermined frequency;
(b) observing a path along which any ejected ink would traverse with an optical sensor to produce a sensor output signal;
(c) integrating the sensor output signal to produce an integrated output signal;
(d) if an output state change is not produced in the integrated output signal, increasing the power level, and repeating steps (a) through (d).

23. The method of claim 22 wherein said step of integrating the sensor output signal comprises filtering the sensor output signal to pass the predetermined frequency at which the power is turned off and on.

24. The method of claim 22 wherein the predetermined frequency is about 5 Hz.

25. The method of claim 22 further comprising biasing the optical sensor in response to the integrated output signal.

* * * * *